United States Patent [19]

Hirano et al.

[11] Patent Number: 4,460,923
[45] Date of Patent: Jul. 17, 1984

[54] PREDICTIVE CODING SYSTEM FOR TELEVISION SIGNALS

[75] Inventors: Akira Hirano; Toshio Koga, both of Tokyo, Japan

[73] Assignee: Nippon Electric Co., Ltd., Tokyo, Japan

[21] Appl. No.: 383,841

[22] Filed: Jun. 1, 1982

[30] Foreign Application Priority Data

Jun. 1, 1981 [JP] Japan .................................. 56-84028
Dec. 12, 1981 [JP] Japan ............................... 56-199499
Dec. 21, 1981 [JP] Japan ............................... 56-206624

[51] Int. Cl.³ ............................................ H04N 7/12
[52] U.S. Cl. .................................... 358/136; 358/138; 375/27
[58] Field of Search ............... 358/135, 136, 138, 133; 375/27

[56] References Cited

U.S. PATENT DOCUMENTS 4,215,374  7/1980  Mizuno ................................. 358/136
4,307,420 12/1981  Ninomiya ............................ 358/136
4,371,895  2/1983  Koga .................................... 358/136

Primary Examiner—Howard W. Britton
Attorney, Agent, or Firm—Remy J. VanOphem

[57] ABSTRACT

In an adaptive predictive coding system for television signals in which one optimum prediction function is selected in block unit from a plurality of prediction functions alloted to a plurality of blocks each consisting of a plurality of picture elements which divide each frame for the television signal and the optimum prediction function is used for predictive coding of the television signal, a motion vector is determined in accordance with both motion vector information and prediction error information, so that the efficiency of coding can be remarkably improved especially where the transmission speed is low.

5 Claims, 16 Drawing Figures

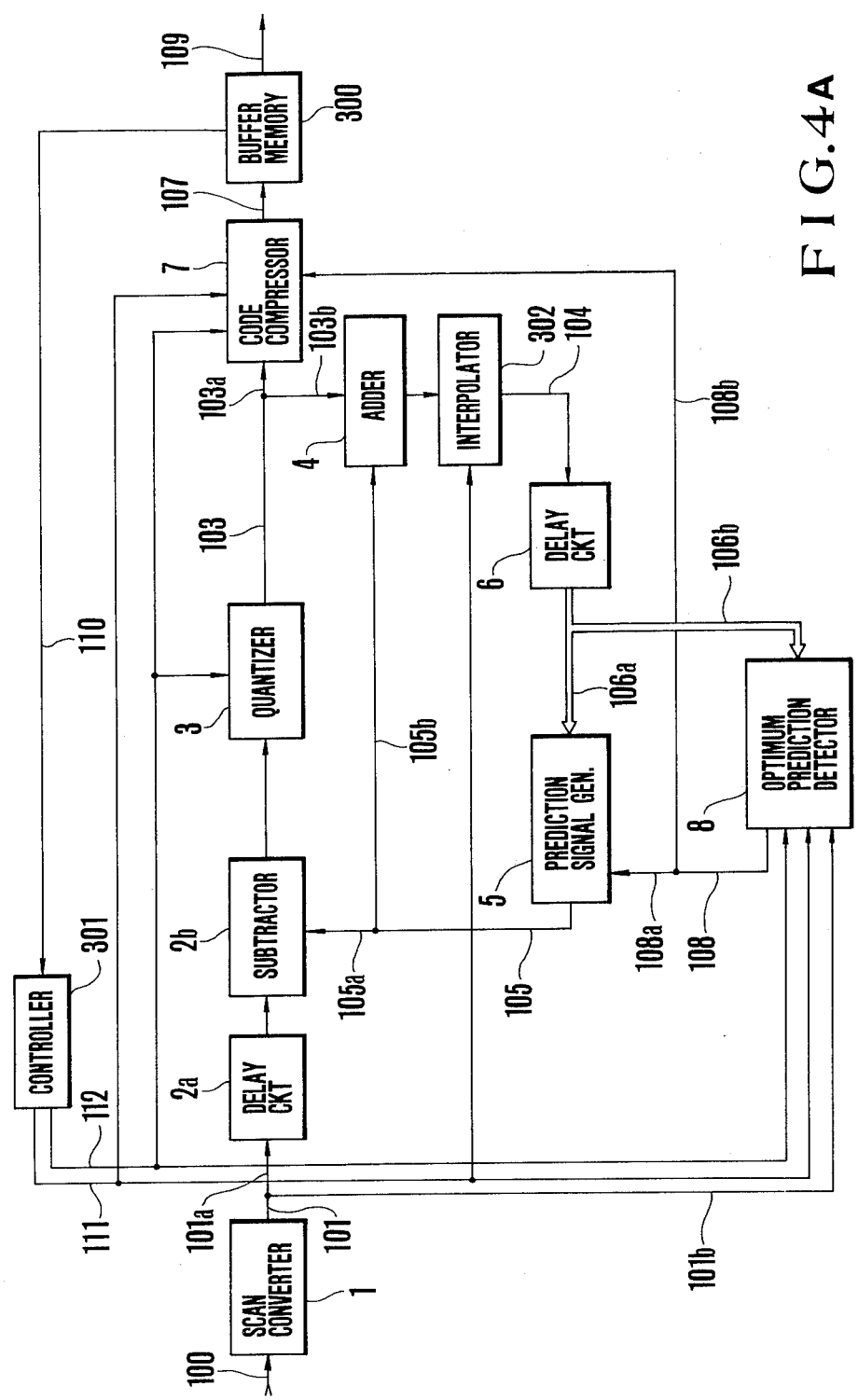

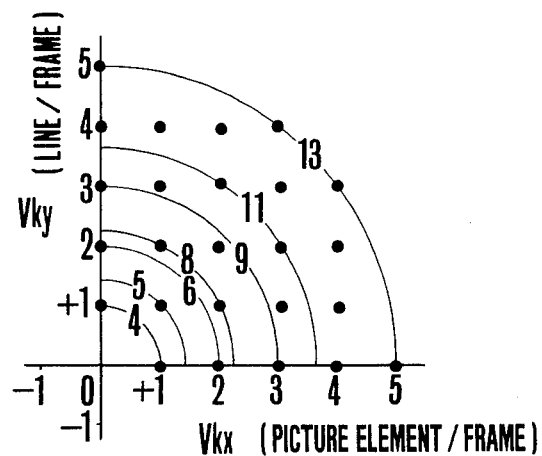
F I G.11A
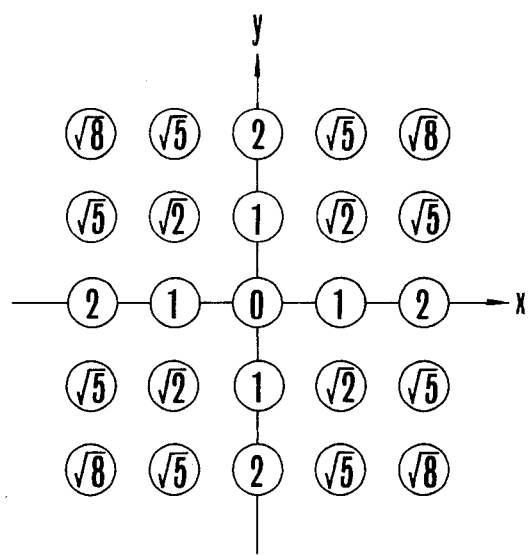
F I G.11B

PREDICTIVE CODING SYSTEM FOR TELEVISION SIGNALS

BACKGROUND OF THE INVENTION

This invention relates to predictive coding system for television signals.

A predictive coding systems operates based on a principle that a difference (that is, a prediction error signal) between a signal to be transmitted and a prediction signal is transmitted so as to decrease the amount of transmission information. This invention contemplates an adaptive predictive coding system wherein a plurality of prediction functions that give the prediction signals are used and an optimum one of the prediction functions is used for performing a prediction coding operation.

In an inter-frame coding system, the prediction error such as prediction error power or brightness having a large magnitude does not occur frequently for motionless pictures and quasi-motionless pictures and less information will therefore be satisfactory. On the other hand, the amount of information to be generated increases for pictures subject to much movement or displacement. Accordingly, in inter-frame coding, coding efficiency is higher for pictures subject to less movement than for pictures subject to much movement.

Many attempts have been made to enhance the coding efficiency for pictures subject to a substantive movement. A movement included in the television signal is mostly assumed to be a parallel movement, and realization of high coding efficiency for moving pictures has been attempted by performing inter-frame prediction in consideration of the amount of shift of an image between contiguous frames. Such an approach is called movement compensation inter-frame prediction. This system is the most effective one for assuring a high coding efficiency even for a moving picture. With this movement compensation inter-frame prediction system, for the purpose of maintaining a high efficiency for various movements, many prediction functions are used. More particularly, a plurality of prediction functions corresponding to movements at various speeds and in various directions are prepared beforehand, and a prediction function most adaptable for an actually occurring movement is used as an optimum function. Generally speaking, a function that makes smallest the prediction error is defined as the optimum function. Consequently, the movement compensation inter-frame prediction system may be considered as an adaptive prediction coding system which adaptably determines a most adaptive prediction function among many prediction functions.

The principle of the movement compensation will be briefly described.

Now, let us consider that a figure located in the proximity of coordinates $(x_o, y_o)$ at time $t=t_o$ is assumed to move to $(x_1, y_1)$ after one frame period $(\tau)$. Since picture elements in a frame preceding by one are used for a prediction signal in the typical interframe predictive coding, picture elements within the figure in the proximity of $(x_o, y_o)$ at $t=t_o$ are used for estimating picture elements within an updated figure in the proximity of $(x_o, y_o)$ at $t=t_o+\tau$. Accordingly, the updated figure having a prediction error being not zero will be generated at $t=t_o+\tau$ in proximity of the points $(x_o, y_o)$ and $(x_1, y_1)$.

If the amount of shift of the updated figure from $(x_o, y_o)$ to $(x_1, y_1)$ can somehow be detected, the updated figure in the proximity of $(x_1, y_1)$ at $t=t_o+\tau$ can be predicted by use of the figure in the proximity of $(x_o, y_o)$ at $t=t_o$, resulting in a considerable reduction in the amount of information to be generated. This is the principle of the so-called "movement compensation". In other words, the optimum prediction points for a figure in the proximity of $(x_1, y_1)$ at $t=t_o+\tau$ are located in the proximity of $(x_o, y_o)$ at $t=t_o$. The optimum prediction point expressed as a function of time or spatial coordinates is called here an optimum prediction function.

An example of the method of detecting the amount of displacement, that is, a method of determining an optimum prediction function is disclosed in U.S. Pat. No. 4,307,420 entitled "Motion-compensated interframe coding system", issued Dec. 22, 1981. According to this patent, prediction errors regarding various prediction functions corresponding to vectors indicative of various movements are compared with each other in block units and a vector corresponding to a prediction function that gives the minimum prediction error is deemed as a motion vector representative of an optimum prediction function. With regard to the effect of movement compensation, it is stated that by applying the movement correction for a moving picture, the amount of information can be reduced to about one-half of the inter-frame coding system, thus attaining considerable compression of information.

As will be discussed later, according to this invention, at least information representing an optimum prediction function and information representing a prediction error obtained when the optimum prediction function is used are transmitted. In a prediction coding system considering the movement, this optimum prediction function is equivalent to a motion vector that performs the best correction for the motion, that is, minimizes the prediction error. In other words, transmission of at least information representing the optimum prediction function and information representing the prediction error obtained when the optimum prediction function is used is the same as the transmission of at least information regarding the motion vector and information regarding the prediction error obtained when the movement is corrected based on the motion vector. In the following description, the optimum prediction function is defined as a "motion vector".

The percentage of the codes necessary to represent this motion vector (that is, the motion vector information) with respect to all of the transmission information varies greatly depending upon the transmission speed at the transmission path used. Where the transmission path has a high transmission speed so that it is possible to assign several bits to one picture element on an average, the motion vector information occupies only a portion of the entirety of information transmitted. However, where the transmission speed is low, the motion vector information occupies a substantial portion of the entirety of information transmitted, for example, more than 50%. An example of the motion vector information measured with reference to an actual picture image, is mentioned in a Hirano et al paper entitled "Investigation regarding the Block Size in the motion compensated inter-frame Coding", lecture No. 697 presented before the general meeting of the Institute of Electronics and Communication Engineers of Japan, communication section, 1980. According to this paper, the entropy of motion vector utilized as a measure of the motion vector information is about 0.1 bit/picture element where a block constituted by a plurality of picture elements has a size of 4 lines × 8 picture elements. This value was obtained when the sampling frequency was 8 MHz, so that information of about 0.8M bits/sec. was dedicated to the motion vector information alone. Accordingly, where a television signal is transmitted at a transmission speed of 1.5M bits/sec., the motion vector information would occupy a little more than 50% of the entirety of information transmitted.

In the past, a relatively high transmission speed was assumed so that it has been considered that the percentage of the motion vector information is negligibly small. Consequently, it has been considered that an optimum prediction which minimizes the amount of the entirety of information transmitted can be realized by detecting a motion vector which minimizes the amount of information representing a prediction error. However, as will be seen from the foregoing description, as the transmission speed decreases, so that motion vector information occupies a percentage that cannot be neglected.

SUMMARY OF THE INVENTION

Accordingly, it is an object of this invention to provide a predictive coding system for television signals capable of minimizing the amount of entirety of transmission information and improving coding efficiency by employing both information representing each prediction function and information representing a prediction error based on each prediction function so as to detect an optimum prediction function, that is, a motion vector.

Briefly stated, according to this invention, when a prediction error is to be determined for detection of a motion vector by using a particular prediction function, the amount of information necessary for representing the particular prediction function can be expressed by a code length, for example, and at the same time, the amount per one block of the prediction error regarding the prediction function can also be expressed by a code length. The sum of these two code lengths is considered to be an amount of information generated when the particular prediction function is used. With regard to the other prediction functions, the sum of two code lengths is similarly determined. A prediction function which is obtained when the result of comparison of the sum of the two code lengths shows a minimum is determined as an optimum prediction function, that is, a motion vector. It is possible to make smaller the amount of the transmission information when the motion vector is determined in this manner than when the motion vector is determined by using only the prediction error information as in the prior art.

As described above, when a motion vector is determined in accordance with both motion vector information and prediction error information, the efficiency of coding can be remarkably improved especially where the transmission speed is low. Accordingly, the invention is especially effective where a television signal undergoes compressive coding and is transmitted at a low speed.

Preferably, the motion vector information is coded into a variable word length code which has the minimum code length for the inter-frame prediction. Specifically, the code length of the variable word length code is minimum for the inter-frame prediction and increases as the norm of the motion vector increases.

BRIEF DESCRIPTION OF THE DRAWINGS

FIG. 4A is a block diagram showing the circuit arrangement of the predictive coding system;

FIG. 11A is a graph showing a pattern of variable-length coding of motion vectors;

FIG. 11B shows an example of a pattern of vectors; and

DESCRIPTION OF PREFERRED EMBODIMENTS

Figure 1:
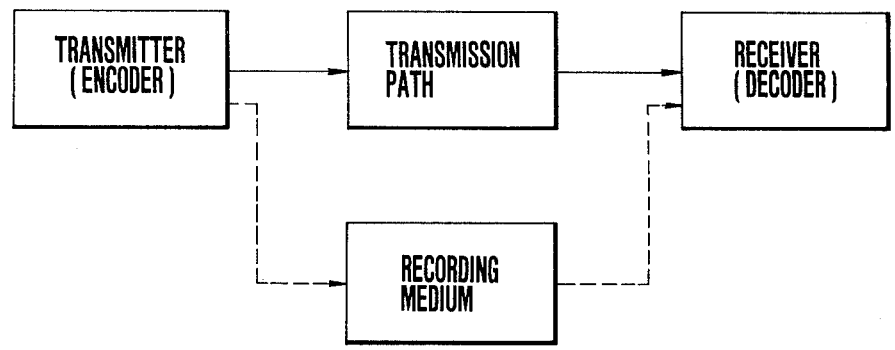
FIG. 1 is a block diagram useful in explaining the concept of a coded video signal transmitting and receiving system.

Referring to FIG. 1, there is shown an overall scheme of a coded video signal transmitting and receiving system. One manner of utilization of a coded video signal is such that, as shown at solid line, an output code from an encoder incorporated in a transmitter is transmitted via a transmission path to a decoder incorporated in a receiver and decoded thereat. The transmission path may include conductive wiring lines or a spatial transmission path. In another manner of utilization, a coded video signal is stored once in a storage or a recording medium and thereafter read out into a decoder as shown in dotted line in FIG. 1. The present system is particularly directed to the former scheme.

Foundation and features of the invention will first be described briefly.

Figure 2:
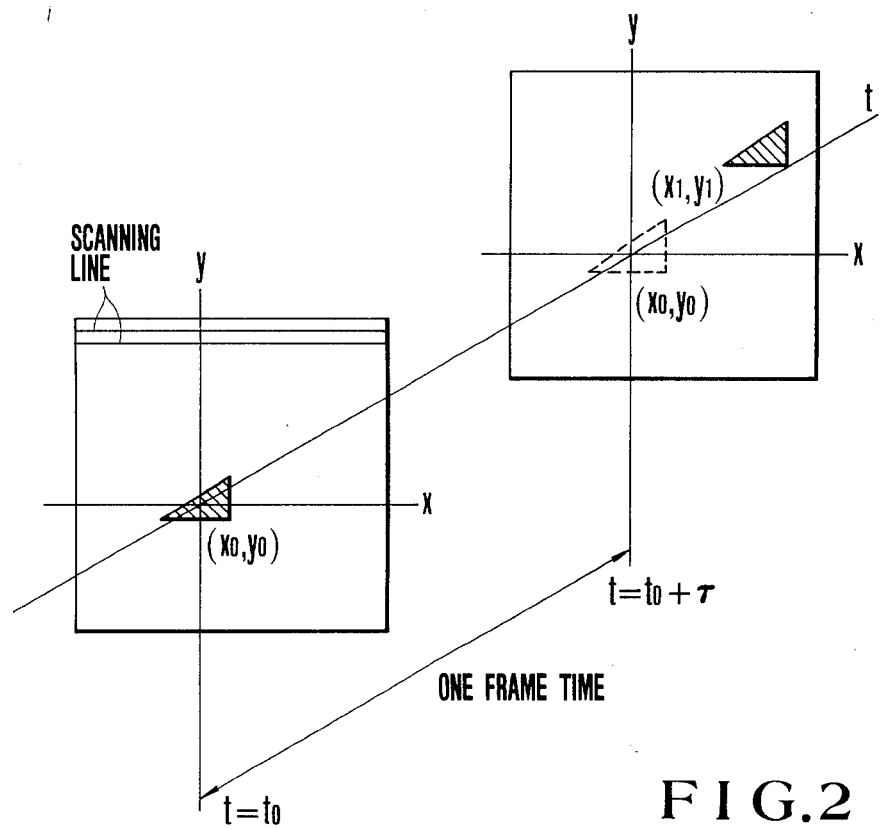
FIG. 2 is an illustration useful for explaining the principle of movement correction for a figure.

With reference to FIG. 2, it is assumed that the scanning line runs in x-direction and sweeps in y-direction, and that a figure (hatched) associated with coordinates $(x_o, y_o)$ at $t=t_o$ shifts to coordinates $(x_1, y_1)$ one frame period after time $\tau$, i.e., at $t=t_o+\tau$. Further, the moving rate of an object to be corrected in the x-direction is assumed to be ±m picture elements per one frame period, and that in the perpendicular y-direction be ±n lines per one frame period. In this case, the number of vectors indicating the rate and direction of the movement is $2m+1$ in the x-direction, $2n+1$ in the y-direction and $N=(2m+1)\times(2n+1)$ in total, where m and n are integers. The number of vectors signifies the number of prediction functions to be prepared. Here is an image which moves at a rate of $V_x$ picture elements per one frame period in the x-direction and $V_y$ lines per one frame period in the y-direction, where $V_x$ and $V_y$ are values within the range of correction, that is, $$-m \leq V_x \leq m$$

$$-n \leq V_y \leq n$$

stand. Thus, prediction at a location shifted by $-V_x$ in the x-direction and $-V_y$ in the y-direction from a corresponding point in the previous frame minimizes and optimizes the prediction error power P. Therefore, the prediction function expressed by use of the vector $(-V_x, -V_y)$ is the optimum prediction function, and is referred to herein as the motion vector.

Figure 3A:
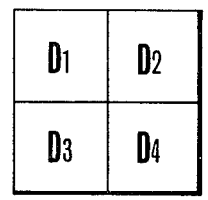
FIGS. 3A and 3B illustrate the arrangement of picture elements in an input block of picture elements and the arrangement of picture elements used for prediction, respectively.
Figure 3B:
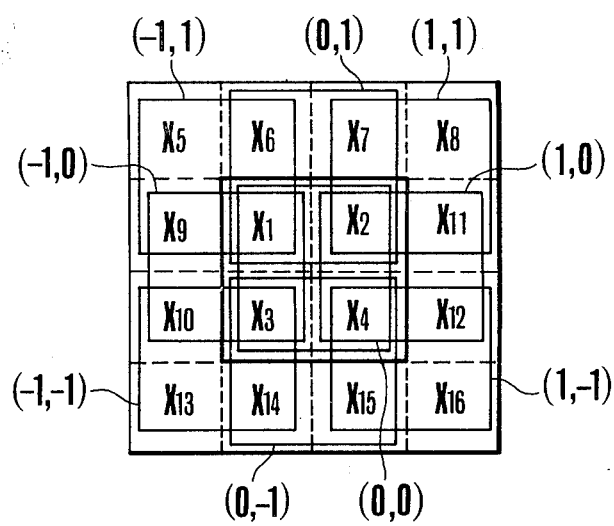

In order to compute a prediction error power P (the squared difference value) in block units to find the optimum prediction function at a high speed, it is effective to carry out computation in parallel for signals which can be processed concurrently. For example, in computing a prediction error power P for determining a motion vector, parallel processing is possible (A) wherein N parallel computations are carried out, N being the range for the movement compensation, or (B) wherein M parallel computations are caried out, M being the number of picture elements within a block. The following describes an example of a block consisting of four picture elements (i.e. M=4). FIG. 3A shows the arrangement of picture elements $D_1$ to $D_4$ in the block of the input picture to be predicted, and FIG. 3B shows the arrangement of picture elements at m=n=1 used for prediction and arranged in two-dimensional coordinates so as to perform the movement compensation efficiently. In FIG. 3B, symbols (0,0), (1,0), ..., (−1, −1) denote prediction vectors. For example, (0, 0) signifies a point in the previous frame, (1, −1) signifies a point which is shifted by one picture element to the right and one line downward from point (0, 0). The foregoing computations (A) and (B) carried out for the prediction vector (1, −1) will now be explained in detail. For process (A), assuming that L is a function which depends on quantizing characteristic and L $(D_1-x)$ represents a length of a variable word length code previously assigned to a prediction error $D_1-x$, nine computations $L(D_1-x_5)$, $L(D_1-X_6)$, $L(D_1-X_7)$, $L(D_1-X_9)$, $L(D_1-X_1)$, $L(D_1-X_2)$, $L(D_1-X_{10})$, $L(D_1-X_3)$, and $L(D_1-X_4)$ are carried out concurrently, which are followed by similar computations for D2, D3 and D4.

For process (B), four computations $L(D_1-X_4)$, $L(D_2-X_{12})$, $L(D_3-X_{15})$, and $L(D_4-D_{16})$ are carried out concurrently, which are followed by computations for the remaining eight prediction vectors. Accordingly, the total number of computations is $4 \times 9 = 36$ for processes (A) and (B). Thus, the number of computations needed to determine the optimum prediction function is M×N for both processes (A) and (B).

In executing the parallel computation by hardware, any one of $L(D_1-X_5)$, $L(D_1-X_6)$, ..., $L(D_1-X_4)$, $L(D_2-X_{12})$, ... is carried out by one arithmetic unit. The result of the computation is assumed to be $P_{ij}$, where i represents a picture element in the block and j represents one of the prediction functions. For process (A), $P_{ij}$ are computed in parallel for j=1, 2, 3, ..., N, then for i=1, 2, 3, ..., M. Accordingly, it is necessary to memorize values $$\sum_{i=1}^{M} P_{ij}$$

for each j so as to compare and determine the minimum prediction error power for the block. For process (A), at least N arithmetic units, N accumulators for storing prediction error power and N comparators for prediction error values are necessary. For process (B), $P_{ij}$ are first added in parallel for i=1, 2, 3, ..., M to obtain $$\sum_{i=1}^{M} P_{ij},$$

and the prediction error power is compared with that of another prediction function so as to determine a smaller one, requiring at most N-time comparisons. It means that the computation can be carried out repeatedly for N times using M arithmetic units and M input adders and comparators. In general, hardware can be minimized for repetition of the same computation by using the same arithmetic circuit repeatedly. In the case of process (A), computation is repeated for the number of picture elements M in a block, and hardware requirement is virtually determined from the number of vectors N.

The television signal which is a typical motion picture signal includes movements at various speeds. Assuming the range of movement compensation to be 6 picture elements per frame horizontally and 6 lines per frame vertically, the number of vectors N becomes 169. On the other hand, the number M of picture elements in a block should be as small as possible, since the larger value of M, especially in the vertical direction, necessitates a large computational unit. In relatively large blocks made up of 8 lines by 16 picture elements, M is 128, and M<N holds.

For the predictive coding system using movement compensation, the range of correction, i.e., the number of vectors N, should preferably be as large as possible and the number of picture elements in a block be as small as possible. From this viewpoint, the method of (A) in which necessary hardware is determined by the value of N and a large range of movement compensation disadvantageously needs an increased hardware. In contrast, the method of (B) mainly uses M arithmetic units repeatedly for N times, and the hardware requirement is virtually determined by the value of M. Thus, it can be seen that the method of (B) is more advantageous.

In addition, in processing the above-mentioned two-dimensional blocks, it is advantageous that the video signal which has been transformed for scanning in advance is used. In this case, picture elements in a two-dimensional block across several scanning lines are rearranged, and picture elements in each block are transformed so that picture elements in one block continue to those in the subsequent block and all picture elements in a two-dimensional block are aligned serially. Accordingly, presence of scanning lines need not be of concern when carrying out prediction coding for picture elements in a two-dimensional block, and a two-dimensional block can be treated identically to a one-dimensional block produced from M picture elements on a single scanning line. As can be seen from the above, when scan conversion is carried out in advance, predictive coding by use of two-dimensional blocks can be no more than predictive coding by use of one-dimensional blocks. According to the present invention, the above process (B) is achieved for determination of the optimum predictive function by repetitive use of M arithmetic units for N times, thus, hardware can be made small when the number of picture elements M included in a block is small. Moreover, the prediction error power for a block for each function can be obtained by single computation, allowing the selection of an prediction function to be compared next while carrying out the computation. It means that all of N-times computations are not always necessary for determining the optimum prediction function.

The present invention will now be described in detail by way of example.

FIG. 4A is a block diagram showing an example of a predictive coding system, which is located on the side of a transmitter and operates to transmit a signal to a predictive decoding system on the side of a receiver. An input video signal is supplied via line 100 to a scan converter 1, in which a plurality of blocks, each consisting of a number of picture elements, are formed. The block-formation video signal is then supplied to a delay circuit 2a and an optimum prediction detector 8 via lines 101a and 101b, respectively, branched from line 101. The delay circuit 2a delays the propagation of the block-formation video signal for a length of time required for determining the optimum prediction function. The delay time is dependent on the number of picture elements included within a block. The video signal is supplied from the delay circuit 2a to a subtractor 2b. Here the difference between the picture signal, and the prediction signal supplied via a line 105a branching from an output line 105 of a prediction signal generator 5, is produced, and the difference, i.e. the prediction error signal, is then supplied to a quantizer 3 which functions to limit the number of possible levels. The quantized prediction error signal is supplied via a line 103a branching from a line 103 to a code compressor 7. At the same time, the prediction signal output from the prediction signal generator 5 is supplied via a line 105b to an adder 4, and here it is added to the quantized prediction error signal supplied via a line 103b so that a locally decoded signal is generated. The locally decoded signal is supplied via an interpolator 302 on a line 104 to a delay circuit 6 so as to be used for generating a subsequent prediction signal. The delay time of the delay circuit 6 is dependent on the prediction function used, and it is chosen in this embodiment as approximately one frame period. The output of the delay circuit 6 is supplied to the prediction signal generator 5 and optimum prediction detector 8 as the locally decoded signal via lines 106a and 106b, respectively. The prediction signal generator 5 generates a prediction signal by using the delayed local decoding signal supplied via line 106a and in accordance with information signifying the optimum prediction function supplied from the optimum prediction detector 8 via lines 108 and 108a, and the generated signal is called the optimum prediction signal as mentioned previously. Determination of the optimum prediction signal is carried out in block units, and predictive coding by using the optimum prediction signal is carried out according to the result of the optimum prediction detection. The optimum prediction detector 8 determines the optimum prediction function by use of the block-formation input video signal supplied via line 101b and the delayed local decoding signal from the delay circuit 6 supplied via line 106b.

Information signifying the optimum prediction function determined as described above is supplied, at the same time, to the code compressor 7 via line 108b. The code compressor 7 performs compressing transformation so that information is expressed by a minimized number of codes by use of information signifying the optimum prediction function, the prediction error signal which is output from the quantizer circuit 3 when that optimum prediction function is used, and the synchronization signal which becomes necessary at the time of decoding. The transformed signal is then sent out via a buffer memory 300 on a line 107 to a transmission line 109 or a storage medium.

Figure 4B:
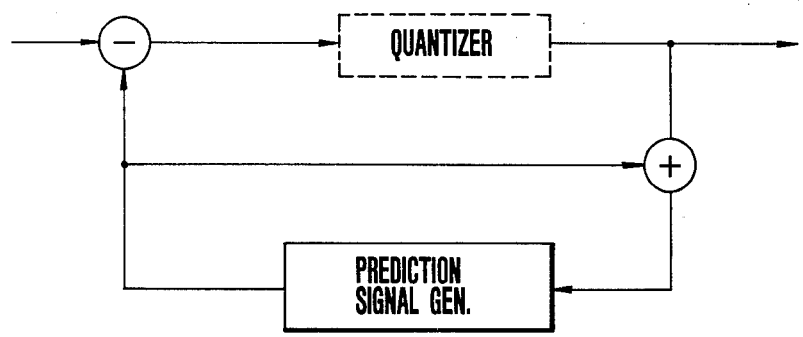
FIG. 4B is a schematic block diagram of a typical predictive encoder.

In FIG. 4A, components as designated by 2b, 3, 4, 5 and 6 constitute a typical predictive coder which can schematically be illustrated as shown in FIG. 4B. The provision of the quantizer as shown at dotted line is not essential.

Figure 4C:
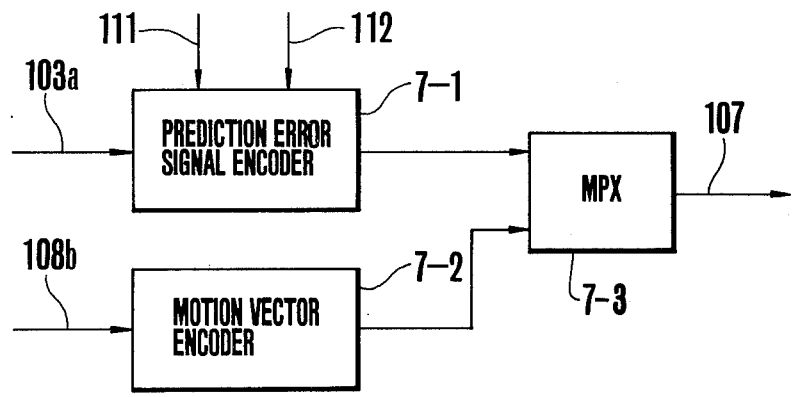
FIG. 4C shows details of a code compressor in FIG. 4A.

The code compressor 7 has a data rate matching function which permits compressed information to be output at a constant data rate, and it includes a prediction error signal encoder 7-1 connected between line 103a and a multiplexor 7-3, and a motion vector encoder 7-2 connected between line 108b and multiplexor 7-3 as shown in FIG. 4C.

A controller 301 is provided for control of coding in accordance with occupancy of the buffer memory 300. Included in the coding control are selection of quantizing characteristics, sub-sample or thin-out of picture elements in horizontal direction, and sub-line or thin-out of picture elements in vertical direction. Through the coding control, coding efficiency can always be optimized in any control mode.

Thus, the controller 301 receives a signal representative of the occupancy of the buffer memory 300 via a line 110, and designates the quantizer 3, optimum prediction detector 8 and code compressor 7 via line 111, and designates the quantizer 3, the optimum prediction detector 8, the code compressor 7 and the interpolator 302 via line 112. The interpolator 302 inserted in the line 104 to receive the sub-sample and sub-line designation acts to interpolate thinned-out picture elements for coding thereof on the basis of coded picture elements and it stands for a through-circuit when the operation is not in the sub-sample or sub-line mode.

Figure 5:
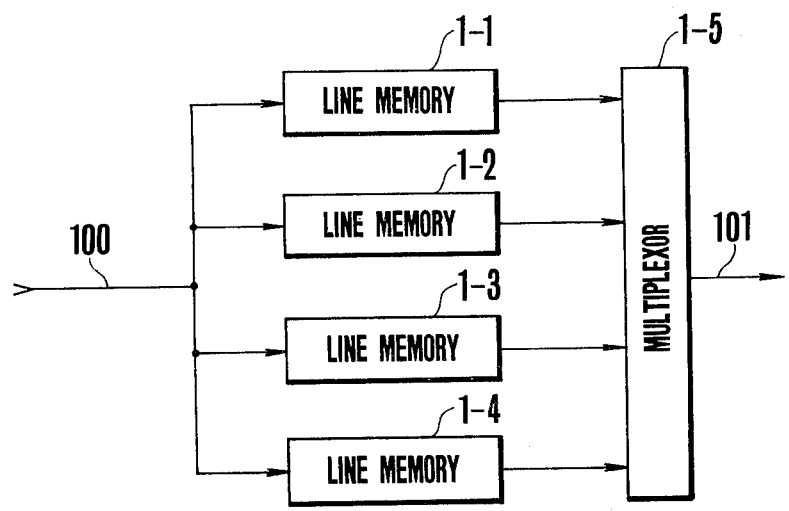
FIG. 5 is a block diagram showing in detail the scan converter of FIG. 4A.
Figure 6:
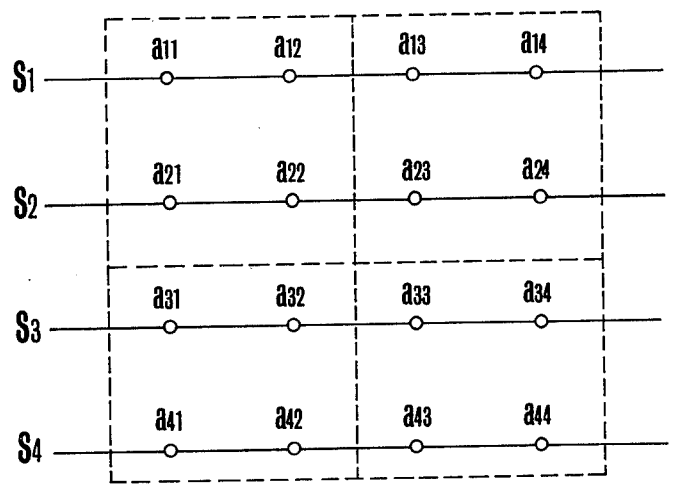
FIG. 6 is an illustration explaining the method of forming blocks for a scanning signal.

FIG. 5 is a block diagram showing in detail the scan converter 1 of FIG. 4A. In this embodiment, 2×2 two-dimensional blocks each consisting of two picture elements in the horizontal direction and two lines in the vertical direction, as shown in FIG. 6, are used. One block includes four picture elements, e.g. $a_{11}$, $a_{12}$, $a_{21}$ and $a_{22}$, enclosed by broken line. In a general television system, the screen is scanned from left to right in the order of, for example, $a_{11}$, $a_{12}$, $a_{13}$ and $a_{14}$, and elements $a_{21}$, $a_{22}$, $a_{23}$ and $a_{24}$ are included on the succeeding scanning line. Therefore, in the circuit of FIG. 5, a signal for scanning line $S_1$ including picture elements $a_{11}$ to $a_{14}$ is stored in a line memory 1-1 and a signal for scanning line $S_2$ including $a_{21}$ to $a_{24}$ is stored in a line memory 1-2 sequentially. Subsequently, when scanning lines $S_3$ and $S_4$, $a_{31}$ to $a_{34}$ and $a_{41}$ to $a_{44}$ are stored in line memories 1-3 and 1-4, respectively, line memories 1-1 and 1-2 are read out in the order of blocks, that is, $a_{11}$, $a_{12}$, $a_{21}$, $a_{22}$, $a_{13}$, $a_{14}$, $a_{23}$, $a_{24}$, and so on. Since reading of scanning lines $S_1$ and $S_2$ in such converted form takes the same time as that for reading the scanning lines without scan conversion, $S_1$ and $S_2$ will have been read when the $S_4$ line signal has just been stored in the line memory 1-4. Then, the line memories 1-3 and 1-4 are read out in the above-mentioned converted form, while succeeding signals for scanning lines $S_5$ and $S_6$ are stored in the line memories 1-1 and 1-2 sequentially.

Line memory pair 1-1 and 1-2 and another line memory pair 1-3 and 1-4 are stored and read out alternately, so that the video signal which is rendered scan conversion i.e. converted into two-dimensional blocks, is output in a string of picture elements. One of two outputs from a line memory pair in reading operation is selectively output through the multiplexor 1-5. The block-formation video signal on a line 101 from the multiplexor 1-5 branches to the lines 101a and 101b, then is supplied to the delay circuit 2a and optimum prediction detector 8, respectively. The above-mentioned scan conversion is advantageous since the predictive coding circuit using the two-dimensional blocks is simple. If any computation in two-dimensional block units were intended without use of the scan conversion, the video signal would be scanned in the order of $a_{11}$, $a_{12}$, $a_{13}$, $a_{14}$, and so on, in FIG. 6, and computation for a two-dimensional block including $a_{11}$, $a_{12}$, $a_{21}$ and $a_{22}$ must wait for picture elements $a_{21}$, $a_{22}$, $a_{23}$ and $a_{24}$ on the next scanning line, resulting in many blocks whose computations are left suspended until the next line is scanned.

On the other hand, after scan conversion has been carried out, the video signal is arranged in the order of $a_{11}$, $a_{12}$, $a_{21}$, $a_{22}$, $a_{13}$, $a_{14}$, $a_{23}$, $a_{24}$ and so on, and computation for a two-dimensional block takes only four picture element periods such as for $a_{11}$, $a_{12}$, $a_{21}$ or for $a_{13}$, $a_{14}$, $a_{23}$ and $a_{24}$, and generally M picture element periods. When scan conversion is carried out in advance, computation for each two-dimensional block becomes the same as that for a one-dimensional block including, for example, $a_{11}$, $a_{12}$, $a_{13}$, and $a_{14}$, thus greatly simplifying the computation control.

Figure 7:
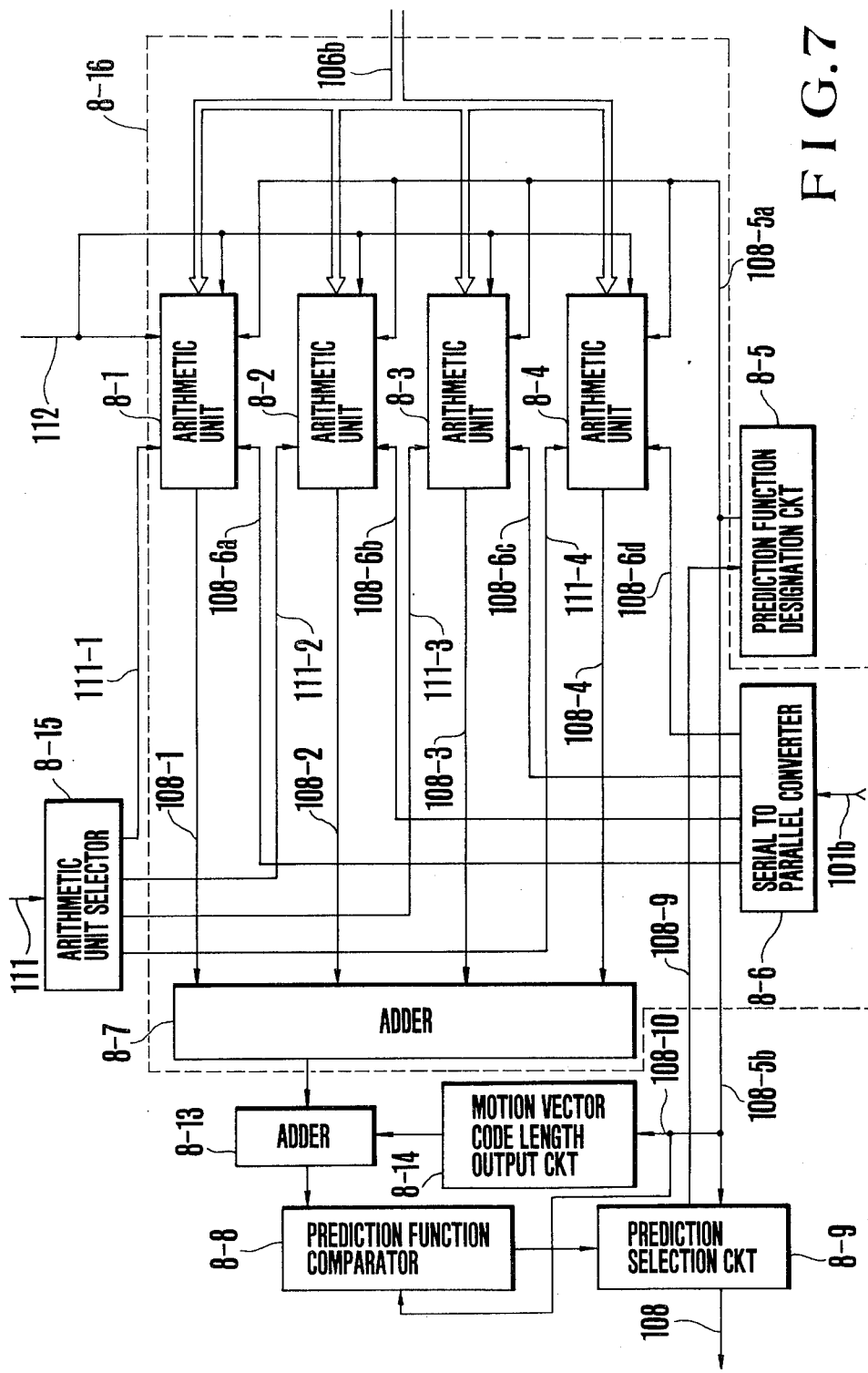
FIG. 7 is a block diagram showing in detail the optimum prediction detector of FIG. 4A.
Figure 8:
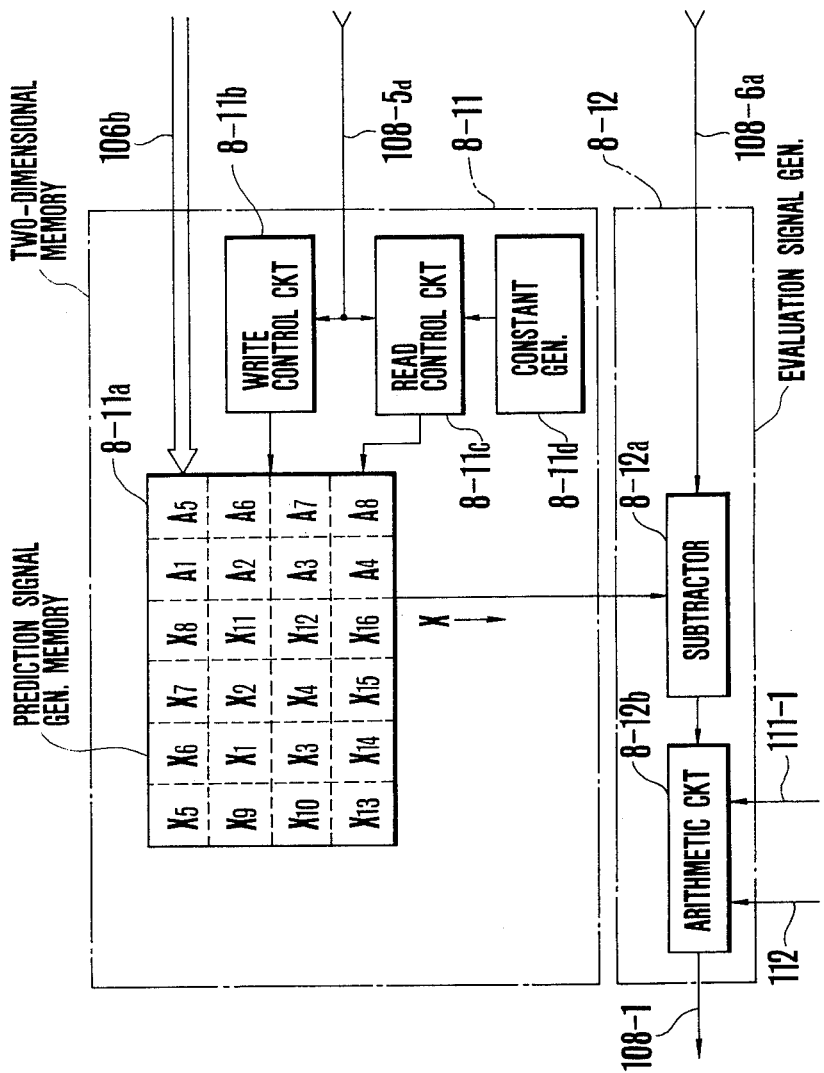
FIG. 8 is a block diagram showing in detail the arithmetic unit of FIG. 7.

FIGS. 7 and 8 are block diagrams showing in detail the optimum prediction detector 8 of FIG. 4a, and an arithmetic unit 8-1 shown in FIG. 7, respectively. As can be seen from FIG. 7, the output signal from the delay circuit 6 supplied via the line 106b to the arithmetic unit 8-1 is temporarily stored in a prediction signal generator memory 8-11a within the arithmetic unit 8-1. The block-formation input signal is supplied via line 101b to a serial to parallel converter 8-6, and here four picture elements in a block, e.g. $D_1$, $D_2$, $D_3$ and $D_4$ of FIG. 3A are output in parallel. One of four parallel picture element outputs is supplied via line 108-6a to a subtractor 8-12a, shown in FIG. 8, within the arithmetic unit 8-1. The position of a picture element processed by the arithmetic unit 8-1 will be called hereinafter picture element point $D_1$ as shown in FIG. 3A. Similarly, other arithmetic units 8-2 through 8-4 are used for computing picture element points $D_2$ through $D_4$, and four arithmetic units in total are used in parallel for concurrent computations for one block.

The process will now be explained in detail for an example of the arithmetic unit 8-1 with reference to FIG. 8. The arithmetic unit 8-1 is mainly made up of a two-dimensional memory 8-11 and an evaluation signal generator 8-12. A two dimensional memory 8-11 consists of the prediction signal generator memory 8-11a, a write control circuit 8-11b which controls addressing of the memory for writing and reading the video signal and timing, a read control circuit 8-11c, and a constant generator 8-11d. The prediction signal generator memory 8-11a can be fabricated easily compactly by employment of register files and RAMs (Random Access Memory). The write control circuit 8-11b operates to write the output signal from the delay circuit 6 as a supplement video signal used for generating a prediction signal in the next block into a specified address of the prediction signal generator memory 8-11a, and this address is determined by the prediction selection signal supplied from a prediction function designation circuit or sequencer 8-5 of FIG. 7 via line 108-5a. The read control circuit 8-11c selectively reads one of the video signals which is stored with the specific values given by the constant generator 8-11d to the respective arithmetic units 8-1 through 8-4, in accordance with the prediction selection signal supplied from the read control circuit 8-11c via line 108-5a. For example, if the prediction selection signal supplied via line 108-5a is the prediction vector (0, 0) in FIG. 3B, the two-dimensional memory 8-11 in the arithmetic unit 8-1 outputs $X=x_1$ and the two-dimensional memories in the arithmetic units 8-2 through 8-4 output $x_2$, $x_3$ and $x_4$, respectively. This can be carried out easily by modifying the reading address (x, y) of the prediction signal generator memory 8-11a, such that the address will be (x, y) for the arithmetic unit 8-1, (x+1, y) for unit 8-2, (x, y+1) for unit 8-3, and (x+1, y+1) for unit 8-4. In this manner, constant vectors (0, 0) (1, 0), (0, 1) and (1, 1) for address modification have been preset to the constant generator 8-11d for the arithmetic units 8-1 through 8-4, respectively, and thus parallel computations for all picture elements within a block are carried out when the unitary prediction selection signal is supplied to the arithmetic units 8-1 through 8-4. It can be seen that the arithmetic units 8-1 through 8-4 having the same circuit arrangement, can carry out respective computations merely by varying the value of constants in the constant generator 8-11d.

An assumption is made here that the picture elements included in a block are disposed in a two-dimensional 2-by-2 array as illustrated in FIG. 6 and the range of movement correction for a block has a rate of ±1 picture element per frame in the horizontal direction and ±1 line per frame in the vertical direction as in the case of the movement compensation range described in conjunction with FIGS. 3A and 3B. Then, in order to correct the movement within this range for this block, 16 predictions from $x_1$ to $x_{16}$ are necessary for 9 prediction vectors from (0, 0) which is mainly used for a stationary picture in the previous frame, (0, 1), (1, 0), ..., (−1, −1), as shown in FIG. 3B. For example, when the vector (0, 1) is used for prediction, a block to be predicted as $x_3$, $x_4$, $x_{14}$ and $x_5$ which is obtained by shifting zero picture element, i.e. no movement, in the horizontal direction and one line downward, e.g. a block including $a_{11}$, $a_{12}$, $a_{21}$ and $a_{22}$ as shown in FIG. 6 is computed. When vector (1, −1) is used for prediction, computation is carried out for $x_4$, $x_{12}$, $x_{15}$ and $x_{16}$. Thus 16 prediction signals are necessary for the above-mentioned movement compensation range.

Assuming that a block which needs to be predicted at this moment, e.g. the block including $a_{11}$, $a_{12}$, $a_{21}$ and $a_{22}$ in FIG. 6, is separated by one frame period from a block including $x_1$, $x_2$, $x_3$ and $x_4$, there are 16 prediction signals from $x_1$ through $x_{16}$ when the movement is compensated for $a_{11}$, $a_{12}$, $a_{21}$ and $a_{22}$, since one block has a width of two picture elements in the horizontal direction. There are also 16 prediction signals for the subsequent block including $a_{13}$, $a_{14}$, $a_{23}$ and $a_{24}$, and they are $x_2, x_4, x_7, x_8, x_{11}, x_{12}, x_{15}, x_{16}$, and $A_1$ through $A_8$. Therefore, during predictive coding using movement compensation for the block of $a_{11}, a_{12}, a_{21}$ and $a_{22}$, eight picture elements, $A_1$ through $A_8$, which are necessary for the next block must be supplemented. Supplementary of $A_1$ through $A_8$ for the prediction signal generator memory 8-11a is carried out by supplying the output of the delay circuit 6 via line 106. If an equal time, e.g. four picture elements periods, is assigned to each of reading and supplementing, it is necessary to supplement two picture elements at one picture element period or time so that eight picture elements are stored within the given time. Therefore, the line 106b must be arranged such that two picture elements can be supplied concurrently. The number of parallel lines for line 106b is determined from the number of picture elements (M) constituting a block, the shape of the block, the range of movement compensation, and the time (T) allowed in determining the optimum prediction signal. For example, in the case of a block having k picture elements in the horizontal direction and L lines in the vertical direction, i.e., $M = k \times L$, with the range of movement compensation $V_x = m$ and $V_y = n$, the allowable time T is not more than the periods of total picture elements M. When predictive coding for the input video signal is desired to be carried out in real time processing, the number of supplementary picture elements $k(2n+L)$ necessary for determining the optimum prediction function for the next block must be supplied within time T. In the previous example, where $k=2$, $L=2$, and $m=n=1$, the number of supplementary picture elements is $2 \times (2 \times 1 + 2) = 8$. In order to supply $k(2n+L)$ picture elements within the M picture element periods, the number of parallel lines required for supplement becomes $k \times (2n+L)/M$, that is, $2 \times (2 \times 1 + 2)/(2 \times 2) = 2$. In other example, where $k=8$, $L=4$ and $m=n=6$, the number of parallel lines required is $8 \times (2 \times 6 + 4)/(8 \times 4) = 4$.

The address of the prediction signal generator memory 8-11a for writing the above-mentioned supplementary picture elements is preferably next to the addresses for storing picture elements which are necessary for determining the optimum prediction function for the current block, for facilitating read/write control. For this purpose, $A_1$ through $A_8$ are written following the addresses for storing $x_1$ through $x_{16}$ as shown in FIG. 8. The necessary storage capacity of the prediction signal generator memory 8-11a is expressed, using symbols k, L, m and n, as $(2m+k) \times (2n+L)$ for determining the optimum prediction function of the current block, $k \times (2n+L)$ for supplementary picture elements for determining the optimum prediction function of the next block, amounting to $2(m+k) \times (2n+L)$ in total.

The prediction signal X, which is selectively output from the prediction signal generator memory 8-11a, is subtracted from the video signal supplied via line 108-6a by a subtractor 8-12a, and the difference is further computed in the squaring operation such as $L(a_{11} - x_3)$ by an arithmetic circuit 8-12b when it is desired to be expressed in terms of the prediction error, e.g. the code length of the variable word length code assigned to prediction error, and the result is output via a line 108-1. Similarly, the results of computations in arithmetic units 8-2 through 8-4 are output via lines 108-2 through 108-4, respectively.

Referring again to FIG. 7, a prediction signal is selected by the prediction selection signals for the arithmetic units 8-1 through 8-4 supplied from the prediction function designation circuit 8-5 via line 108-5a, then the difference signals between the video signal supplied via line 106b and the prediction signals are generated. The result of the arithmetic circuits 8-1 to 8-4 are supplied to an adder 8-7 via respective lines 108-1 through 108-4. The adder 8-7 performs addition for four inputs. When prediction vector $(0, -1)$ is used, for example, $L(a_{11} - x_3) + L(a_{12} - x_4) + L(a_{21} - x_{14}) + L(a_{22} - x_{15})$ is carried out, and the result of addition is supplied to another adder 8-13. The result of addition at the adder 8-7, i.e. the summation of code lengths of prediction error for each block corresponds to one prediction function (or shift vector) which has been specified in the order predetermined by the prediction function designation circuit 8-5. An article "Transmitting 4-MHz TV signals by combinational difference coding", by Hiroshi Yasuda et al, IEEE Transaction on communications, Vol. COM-25, No. 5, May, 1977, pp 508–516 partly exemplifies the manner of forming a variable word code length of the prediction error.

On the other hand, the prediction function delivered out of the sequencer 8-5 is supplied not only to the prediction information amount generator generally designated at 8-16 (the second evaluation means) but also to a prediction function comparator 8-8 and a vector code length generator or a motion vector code length output circuit 8-14 which may include a ROM. The vector code length generator 8-14 (the first evaluation means) delivers to the adder 8-13 a predetermined code length signal for the purpose of representing the supplied prediction function.

The vector code length may preferably be of variable code length. Usually, a motion vector corresponding to an inter-frame prediction occurs most frequently, so that this motion vector is represented by the shortest code (code length 1). However, when a variable code length method, for example, modified Huffman coding method is applied to a series (or run) of the shortest codes, the average code length per one motion vector becomes much shorter than 1. Consequently, the code length of the prediction function representing the inter-frame prediction can be made approximately zero at the vector code length generator 8-14. The code length of a prediction function of the prediction other than the inter-frame may optionally be determined but preferably, its length may be increased as the degree of departure from the inter-frame prediction increases. For example, as shown in FIG. 11A, a code having a four-bit length is assigned to a prediction function predicting a point displaced one picture element from the inter-frame prediction in the vertical or horizontal direction in a space, a code of a five-bit length is assigned to a prediction function representing a prediction displaced one picture element in both horizontal and vertical directions, and a code of six-bit length is assigned to a prediction function predicting a point displaced two picture elements in either one of the horizontal and vertical directions. Thus, the code length is increased in accordance with the displacement or norm of motion vector.

In FIG. 11A, the pattern of the length of variable word length code illustrated in connection with the first quadrant is applied to the remaining quadrants but not depicted for simplicity of illustration.

The above patterning of the length of variable word length code is grounded on the following.

More particularly, in a conference TV, the frequency of occurrence of motion vector is the maximum for a motion vector indicative of a standstill picture, that is, corresponding to a inter-frame prediction, and tends to decrease as the norm of motion vector increases. For this reason, it is possible to efficiently convert an input vector into a variable length code in accordance with the pattern of variable code length as shown in FIG. 11A. Further, when the quantizing characteristic of the prediction error signal is made rough, picture quality degradation inherent to the inter-frame coding called "dirty window" occurs in which quantized noise stands still on the picture so that as if a picture were viewed through a dirty window. On the other hand, in the movement compensation inter-frame coding, there arises a new problem of degraded picture quality in which the dirty window is seen moving. The new problem of degrading the picture quality is remarkable at a standstill portion of the television picture image especially when the signal to noise ratio (S/N) of the input television signal is low. The reason of occurrence of the degradation of the picture quality in the movement compensation inter-frame coding is as follows. Thus, as described above, in the movement compensation inter-frame coding, the predictive coding operation is effected by using a signal of the preceding frame having the highest degree of similarity to be a signal in the blocks in the present frame as a prediction signal. However, when the input television signal contains noise, even at the standstill portion, the degree of similarity to a shift vector (0, 0) showing that the blocks are standstill is not always the maximum with the result that the standstill portion may inadvertently be judged as a moving portion. Consequently, a dirty window which is standstill in the inter-frame coding is seen moving in the movement compensation inter-frame coding, thus greatly degrading the picture quality.

The aforementioned variable code length pattern in which the code length of the prediction function representing the inter-frame prediction is made substantially zero can eliminate the picture quality degradation leading to moving dirty window in the movement correction coding, because the inter-frame prediction is always selected in the standstill portion by using the present invention.

Returning to FIG. 7, the adder 8-13 adds the length of a code representing a prediction function to a prediction error information amount per one block when this prediction function is used and supplies the result of addition to the prediction function comparator 8-8 which compares this result of addition with the previously determined sum to check whether the present result of addition is a minimum or not. When it is the minimum, the prediction function comparator 8—8 selects and holds the prediction function supplied through line 108-5*b* at this time as a temporary optimum prediction function, but when the result of judgment is "no" the comparator 8—8 holds the previously determined temporary optimum prediction function as it is. The temporary optimum function is always supplied to a prediction selection circuit 8-9 which delivers the detected optimum prediction function, that is, a motion vector onto the line 108 in accordance with a timing signal corresponding to the divisions of the blocks and supplied from the sequence 8-5 over the line 108-5*b*. The motion vector thus determined is the output from the optimum prediction detector 8.

In the coding control mode, the sub-sample and sub-line designation from line 111 is selectively supplied to the respective arithmetic units 8-1, 8-2, 8-3 and 8-4 via an arithmetic unit selector 8-15 and lines 111-1, 111-2, 111-3, and 111-4; and the quantizing characteristic designation from the line 112 is directly fed to the respective arithmetic units.

Figures 9, 10:
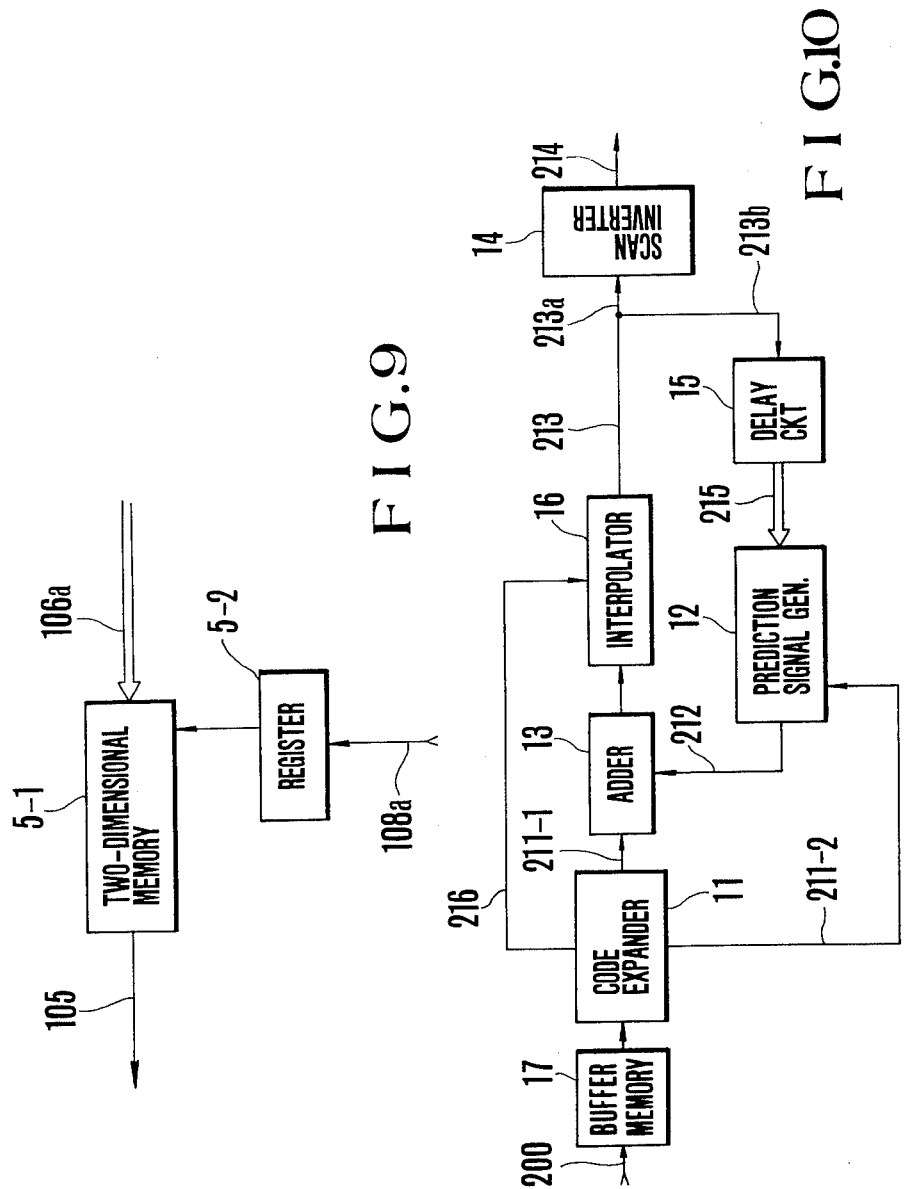
FIG. 9 is a block diagram showing in detail the prediction signal generator of FIG. 4A.
FIG. 10 is a block diagram of the predictive decoding system embodying the present invention.

FIG. 9 is a block diagram showing in detail the prediction signal generator 5 in FIG. 4A. In the figure, a two-dimensional memory 5-1 has substantially the same structure as that of the two-dimensional memory 8-11 included in the arithmetic unit 8-1. The difference of these memories is that an internal prediction signal generator memory (not shown) receives an output from a register 5-2 which holds information signifying the optimum prediction function for one block period, and an internal read control circuit (not shown) reads out all picture elements in the block onto line 105 sequentially and automatically in accordance with the contents of the information. A constant generator (not shown) included in the two-dimensional memory 5-1 is preset to (0, 0) identical to the constant generator 8-11*d* in FIG. 8, and if (0, −1), for example, is the prediction vector corresponding to the optimum prediction function, $x_3$, $x_4$, $x_{14}$ and $x_{15}$ are obtained sequentially as the optimum prediction signals on line 105. While outputting the optimum prediction signal, it is necessary for the two-dimensional memory 5-1 to supplement the prediction signal generator memory with a local decoding signal supplied via line 106*a*, in order to generate the optimum prediction signal for the next block. The method of supplement is the same as that for the prediction signal generator memory 8-11*a* in the foregoing arithmetic unit. Accordingly, the prediction signal generator 5 is slightly expanded for the function of the read control circuit as compared with the arithmetic unit 8-1.

The range of movement compensation as described above by way of example is by no means limited by the type of prediction function or the number of picture elements included in a block, and if, for example, the range of movement correction is +6 picture elements per frame and +6 lines per frame in the horizontal and vertical directions, respectively, (the number of types of prediction function is 169), and the number of picture elements in one block is 4 lines × 8 picture elements, i.e. 32 picture elements, the optimum prediction function can be obtained by repeating the computation in circuit 8 for determining the optimum prediction function for a maximum of 169 times using 32 arithmetic units. When the optimum prediction function is determined in real time processing for a block including 32 picture elements, for example, it must be carried out within 32 picture element periods.

FIG. 10 is a block diagram showing an embodiment of the predictive decoding system in accordance with the present invention. In the figure, the video signal which has been coded by prediction by means of the predictive coding system of FIG. 4A and provided with compressed information is supplied from a transmission path or storage medium via line 200 and a buffer memory 17, and it is separated by a code expander 11 into a sync signal which has been inserted by the code compressor 7 in the coding system for reproduction of the original picture, information representing the optimum prediction function and a prediction error signal for the optimum prediction function. The expanded and separated information representing the optimum prediction function and prediction error signal are supplied to a prediction signal generator 12 and an adder 13 via lines 211-2 and 211-1, respectively. The prediction signal generator 12 generates the optimum prediction signal in accordance with information representing the optimum prediction function, and the function and structure of the generator are the same as those of the prediction signal generator 5 in the predictive coding system. The generated prediction signal is supplied via line 212 to the adder 13 and added to the prediction error signal supplied via line 211-1, so that a video signal is reproduced. The reproduced video signal is then supplied to a scan inverter circuit 14 and a delay circuit 15 via an interpolator 16 and lines 213a and 213b branching from line 213. The interpolator 16 connected to the code expander 11 via a line 216 matches the interpolator 302 as shown in FIG. 4A in the coding control mode.

The delay time of the delay circuit 15 is the same as that of the delay circuit 6 in the predictive coding system and is about one frame period. The delayed reproduced video signal is supplied as the supplementary picture element signal to the prediction signal generator 12 via line 215, so that the prediction signal necessary for the next block is generated in the prediction signal generator 12. The number of parallel lines for line 215 is determined by the number of picture elements included in a block the shape of the block, the range of movement compensation and time allowed to determine the optimum prediction function, as in the case of line 106a in the predictive coding apparatus. The reproduced video signal supplied from the interpolator 16 via line 213a is still block-formed and cannot be displayed correctly on a generally used monitor and display units. Therefore, the reproduced picture signal is transformed by the scan inverter circuit 14 back to the video signal in original time series, then the decoded video signal is sent out on line 214.

FIG. 11B shows one example wherein a differential vector signal produces twenty-five vectors on the x-y coordinates, in which digits in circles show the magnitudes, that is, the absolute values of the vectors.

Figure 11C:
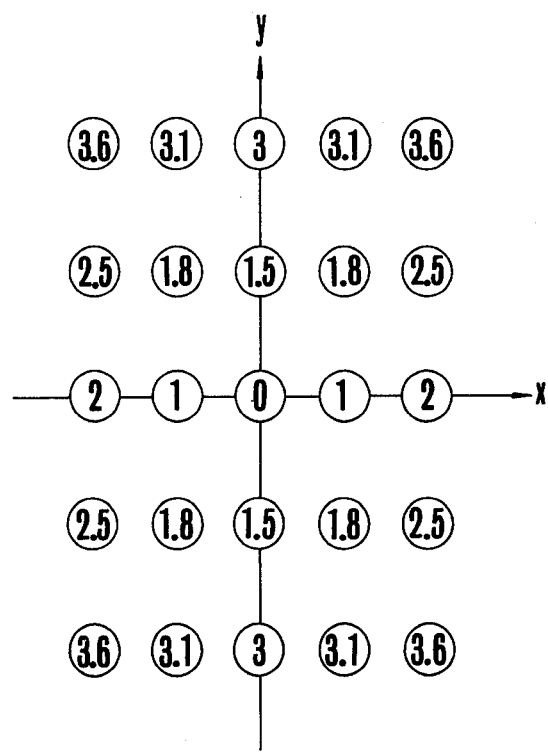
FIG. 11C shows another example of a pattern of vectors.

Incidentally, when detecting the movement of a television picture image, it is usual to make a unit of the movement component in the horizontal direction equal to the distance between adjacent picture elements ($D_P$) or in the vertical direction one horizontal scanning line spacing ($D_L$) is used as a unit. The ratio $F = D_L/D_P$ is not always one and is proportional to the sampling frequency of the television signal. It should be understood that the invention is also applicable to a case where R is not equal to one. One, as shown in FIG. 11C, FIG. 11c shows differential vectors on x-y coordinates, where R=1.5. In the same manner as in FIG. 11B, digits bounded by circles show absolute values of vectors. In FIG. 11C, in the x axis direction, values are normalized with $D_P$, while in the y axis direction with $D_L$.

In the foregoing description, a prediction function corresponding to a vector which makes minimum the summation of the sum of the length of variable word length code assigned to the motion vector and the length of variable word length code assigned to the prediction error is defined as an optimum prediction function and selected. On the other hand, in a television picture image, motion vectors generated at adjacent portions on a screen have an intimate correlation, so that a differential vector between the present motion vector and the preceding motion vector occurs frequently in a region where the absolute value is small. Accordingly, the present invention may be modified as follows. More particularly, a variable word length code is assigned to a differential vector between vectors in adjacent blocks, and a prediction function corresponding to a vector which makes minimum the summation of the sum of the length of variable word length code assigned to the differential vector and the length of variable word length code assigned to prediction errors in the blocks is defined as an optimum prediction function and selected. This modification can be accomplished by slightly modifying the previous embodiment. Namely, the motion vector code length output circuit 8-14 in FIG. 7 is incorporated with a memory and a subtractor, motion vectors detected from adjacent blocks are temporarily stored, a differential vector between the motion vectors and the signal supplied via the signal line 108-10 is determined, and a length of variable word length code corresponding to this differential vector is delivered out of the circuit 8-14. Also, the code compressor 7 in FIG. 4A is incorporated with a memory and a subtractor, and a variable word length code corresponding to a differential vector between motion vectors in adjacent blocks is delivered out of the code compressor 7.

What is claimed is:

1. An adaptive predictive coding system for television signals in which one optimum prediction function is selected in block unit from a plurality of prediction functions alloted to a plurality of blocks each consisting of a plurality of picture elements which divide each frame for the television signal and the optimum prediction function is used for predictive coding of the television signal, said system comprising:

means for coding said optimum prediction function into a variable word length code having the length which is minimum for a prediction function that occurs most frequently and increases as the norm of a differential vector between the most frequently occurring prediction function and another prediction function increases; and means for coding a prediction error signal into a variable word length code having the length which increases as the amplitude of said error signal increases.

2. An adaptive predictive coding system for television signals in which one optimum prediction function is selected in block unit from a plurality of prediction functions alloted to a plurality of blocks each consisting of a plurality of picture elements which divide each frame for the television signal and the optimum prediction function is used for predictive coding of the television signal, said system comprising:

optimum prediction function detector means including first evaluation means for evaluating an amount of information necessary to represent a given prediction function among said plurality of prediction functions, second evaluation means for evaluating an amount of information necessary to represent an amount of prediction error per one block regarding the given prediction function, adder means for adding amounts of evaluation information delivered out of said first and second evaluation means, comparing means for comparing an output of said adder means with a part or whole of said plurality of prediction functions, and means for delivering out, in block unit, one of said prediction functions which is responsible for production of a minimum sum as an optimum prediction function;

predictive coding means for performing a predictive coding operation in accordance with said optimum prediction function; and means for compressive coding of information, said information containing at least information representing said optimum prediction function and information representing a prediction error delivered out of said predictive coding means when said optimum prediction function is used.

3. An adaptive coding system according to claim 2 wherein said prediction function for determination of the evaluation by said second evaluation means is controlled in accordance with buffer memory occupancy of the system.

4. An adaptive coding system according to claim 2 wherein said first evaluation means evaluates said prediction function by encoding it into a variable word length code which has the minimum code length for the inter-frame prediction.

5. An adaptive coding system according to claim 4 wherein said code length of said variable word length code is minimum for said inter-frame prediction and increases as the norm of said prediction function increases.

* * * * *

UNITED STATES PATENT AND TRADEMARK OFFICE
CERTIFICATE OF CORRECTION

PATENT NO. : 4,460,923

DATED : July 17, 1984

INVENTOR(S) : Hirano, et al.

It is certified that error appears in the above-identified patent and that said Letters Patent is hereby corrected as shown below:

Column 1, line 7, delete "system" and insert ---- systems ----.

Column 1, line 9, delete "systems" and insert ---- system ----.

Column 3, line 57, delete "efficienty" and insert ---- efficiency ----.

Column 10, line 34, after "8-4" insert a comma ---- , ----.

Column 11, line 6, delete "tary" and insert ---- ting ----.

Column 12, line 61, delete "the", third occurrence.

Signed and Sealed this

Ninth Day of April 1985

[SEAL]

Attest:

DONALD J. QUIGG

*Attesting Officer*  *Acting Commissioner of Patents and Trademarks*